(12) United States Patent
Wakeman et al.

(10) Patent No.: US 8,292,238 B2
(45) Date of Patent: Oct. 23, 2012

(54) THRUST BEARING SUPPORT ASSEMBLY FOR A GAS TURBINE ENGINE

(75) Inventors: Thomas George Wakeman, Frankfort, OH (US); Peter Walter Mueller, Morrow, OH (US); Stephen Eugene Melton, West Chester, OH (US); Michael Todd Summers, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 380 days.

(21) Appl. No.: 12/359,066

(22) Filed: Jan. 23, 2009

(65) Prior Publication Data

US 2009/0246002 A1 Oct. 1, 2009

Related U.S. Application Data

(62) Division of application No. 11/006,924, filed on Dec. 8, 2004, now Pat. No. 7,546,742.

(51) Int. Cl.
*F16L 3/22* (2006.01)

(52) U.S. Cl. .................. 248/68.1; 248/671; 248/678

(58) Field of Classification Search .......... 248/65, 248/72, 73, 74.1, 62, 68.1, 74.3, 671, 678
See application file for complete search history.

(56) References Cited

U.S. PATENT DOCUMENTS

| | | | | |
|---|---|---|---|---|
| 2,568,783 | A * | 9/1951 | Woodruff | 241/285.1 |
| D190,429 | S * | 5/1961 | Hoagland | D6/552 |
| 3,455,107 | A * | 7/1969 | Dixon | 60/798 |
| 3,556,672 | A | 1/1971 | Gentile | |
| 3,837,164 | A | 9/1974 | Carr | |
| 3,851,607 | A * | 12/1974 | August et al. | 248/678 |
| 4,899,963 | A * | 2/1990 | Murphy | 248/65 |
| 4,922,709 | A | 5/1990 | Hendriks | |
| 6,044,592 | A * | 4/2000 | Strieter | 52/27 |
| 6,279,309 | B1 * | 8/2001 | Lawlor et al. | 60/772 |
| 6,518,499 | B1 * | 2/2003 | Kessler | 174/50 |
| 6,682,025 | B2 * | 1/2004 | Turner et al. | 248/65 |
| 6,889,944 | B2 * | 5/2005 | Brandzel et al. | 248/68.1 |
| 7,007,978 | B1 * | 3/2006 | Purdom | 280/809 |
| 7,278,613 | B2 * | 10/2007 | Roy | 248/49 |
| 7,441,731 | B2 * | 10/2008 | Smart et al. | 248/74.1 |
| 7,607,619 | B2 * | 10/2009 | Smart et al. | 248/74.1 |
| 7,731,131 | B2 * | 6/2010 | Trueb | 248/49 |
| 2003/0047658 | A1 * | 3/2003 | Peter et al. | 248/346.01 |
| 2005/0017151 | A1 * | 1/2005 | Battig | 248/678 |
| 2007/0045482 | A1 * | 3/2007 | Smart | 248/68.1 |
| 2010/0155545 | A1 * | 6/2010 | Birli et al. | 248/70 |

FOREIGN PATENT DOCUMENTS

| | | |
|---|---|---|
| JP | 49043011 A | 4/1974 |
| JP | 01253531 A | 10/1989 |
| JP | 06087638 U | 12/1994 |

OTHER PUBLICATIONS

Japanese Office Action for co-pending Japanese patent application No. 2005-337987 (6 pages).

* cited by examiner

*Primary Examiner* — Nkeisha Smith
(74) *Attorney, Agent, or Firm* — David J. Clement, Esq.; Armstrong Teasdale LLP

(57) ABSTRACT

A thrust bearing support assembly includes a first substantially trapezoidally-shaped side, and a second substantially rectangularly-shaped side coupled to the first side. The thrust bearing support assembly also includes a third substantially trapezoidally-shaped side coupled to the second side, and a fourth substantially rectangularly-shaped side coupled to the first and third sides.

7 Claims, 9 Drawing Sheets

THRUST BEARING SUPPORT ASSEMBLY FOR A GAS TURBINE ENGINE

CROSS REFERENCE TO RELATED APPLICATIONS

This application is a divisional patent application and claims priority to U.S. patent application Ser. No. 11/006,924 filed Dec. 8, 2004 now U.S. Pat. No. 7,546,742 for "GAS TURBINE ENGINE ASSEMBLY AND METHOD OF ASSEMBLING SAME," which is hereby incorporated by reference herein in its entirety.

BACKGROUND OF THE INVENTION

This invention relates generally to gas turbine engines, and more specifically to a gas turbine engine and method of assembling a gas turbine engine.

At least some known gas turbine engines include, in serial flow arrangement, a high-pressure compressor for compressing air flowing through the engine, a combustor in which fuel is mixed with the compressed air and ignited to form a high temperature gas stream, and a high pressure turbine. The high-pressure compressor, combustor and high-pressure turbine are sometimes collectively referred to as the core engine. Such gas turbine engines may also include a low-pressure turbine or power turbine for transmitting power generated by the core engine to a driven component, such as a generator, for example.

Gas turbine engines are used in many applications, including aircraft, power generation, and marine applications. At least some known gas turbine engines include two thrust mounts that are coupled between an exterior surface of the gas turbine engine and a support structure. During engine operation, at least some known thrust mounts may cause at least some structural distortion or "out of round" condition of the gas turbine engine casing which may reduce blade tip clearances within the gas turbine engine. Moreover, when a power turbine is coupled to the core gas turbine engine, the combination of loads and geometries may also cause some structural distortion which may also reduce blade tip clearances within the gas turbine engine.

For example, during operation, the thrust load generated by at least some known power turbine rotors is approximately 250,000 lb in a direction that is opposite to the direction of thrust generated by the gas turbine engine. Accordingly, during operation, thrust generated by the power turbine is transferred to the engine thrust mounts, thus increasing the possibility that the gas turbine engine may experience structural distortion, or an "out of round" condition. Alternatively, thrust generated by the power turbine may be transferred to the power turbine thrust bearing support which may also increase the possibility that the gas turbine engine may experience structural distortion. To facilitate reducing such structural distortion, at least some known turbines attempt to balance loading between the engine thrust mounts and the power turbine thrust bearing support. However, even if the power turbine thrust load is balanced between the engine thrust mounts and the power turbine thrust bearing support, the combined power turbine rotor load and the gas turbine engine residual load may cause the core gas turbine engine casing to distort which may reduce blade tip clearances within the gas turbine engine.

BRIEF DESCRIPTION OF THE INVENTION

In one aspect, a method for assembling a gas turbine engine assembly is provided. The method includes coupling a core gas turbine engine to a power turbine, coupling the power turbine to a thrust bearing support assembly through a frusto-conically shaped structural support such that the net axial thrust of the coupled core gas turbine engine and power turbine reacts through the thrust bearing support assembly at engine centerline to facilitate minimizing distortion of the core gas turbine engine casing, and supporting the thrust bearing support assembly such that all of the remaining thrust generated by the core gas turbine engine and the power turbine is reacted to ground.

In another aspect, a thrust bearing support assembly for a gas turbine engine assembly is provided. The gas turbine engine assembly includes a gas turbine engine, a power turbine coupled to the gas turbine engine, and a thrust bearing coupled to the power turbine and a thrust bearing support assembly coupled to the power turbine thrust bearing. The thrust bearing support assembly includes a first side, a second side coupled to the first side, a third side coupled to the second side, and a fourth side coupled to the first and third sides such that the thrust bearing support assembly is shaped substantially trapezoidally.

In a further aspect, a gas turbine engine assembly is provided. The gas turbine engine assembly includes a gas turbine engine including a first compressor, a second compressor downstream from the first compressor, a turbine coupled in flow communication with the second compressor, a power turbine coupled to the gas turbine engine, a thrust bearing coupled to the power turbine, and a thrust bearing support assembly coupled to the thrust bearing. The thrust bearing support assembly includes a first side, a second side coupled to the first side, a third side coupled to the second side, and a fourth side coupled to the first and third sides such that the thrust bearing support assembly is shaped substantially trapezoidally.

BRIEF DESCRIPTION OF THE DRAWINGS

(FIG. 8 not found)

(FIGS. 8 and 9 not found)

DETAILED DESCRIPTION OF THE INVENTION

Figure 1:
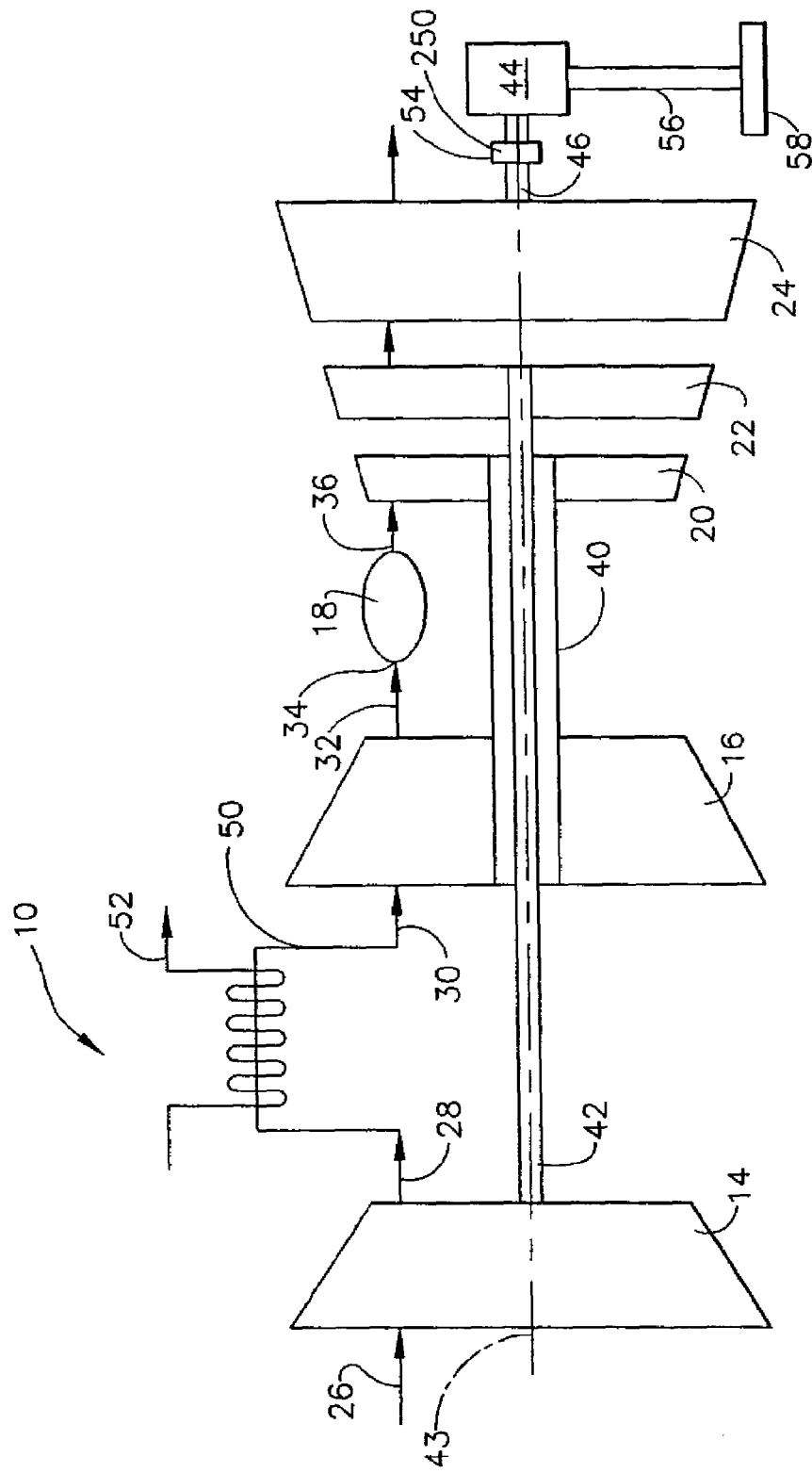
FIG. 1 is a block diagram of an exemplary gas turbine engine.

FIG. 1 is a block diagram of a gas turbine engine assembly 10. Gas turbine engine 10 includes, in serial flow relationship, a low pressure compressor or booster 14, a high pressure compressor 16, a combustor 18, a high pressure turbine 20, an intermediate pressure turbine 22, and a low pressure or power turbine 24. Low pressure compressor or booster 14 has an inlet 26 and an outlet 28, and high pressure compressor 16 includes an inlet 30 and an outlet 32. Combustor 18 has an inlet 34 that is substantially coincident with high pressure compressor outlet 32, and an outlet 36. In the exemplary embodiment, gas turbine engine assembly 10 is an LMS 100 manufactured by General Electric Company.

High pressure turbine 20 is coupled to high pressure compressor 16 with a first rotor shaft 40, and intermediate pressure turbine 22 is coupled to low pressure compressor 14 with a second rotor shaft 42. Rotor shafts 40 and 42 are each substantially coaxially aligned with respect to a longitudinal centerline axis 43 of engine 10. Engine 10 may be used to drive a load 44, such as a generator, which may be coupled to a power turbine shaft 46. Alternatively, the load may be coupled to a forward extension (not shown) of rotor shaft 42.

In the exemplary embodiment, gas turbine engine assembly 10 also includes an intercooler heat exchanger 50 that is positioned between low pressure compressor or booster 14 and high pressure compressor 16 to facilitate reducing the temperature of the air entering high pressure compressor 16. Using an intercooler facilitates increasing the efficiency of the engine while reducing the quantity of work performed by the high pressure compressor. At least one known intercooler heat exchanger uses ambient air or water as a cooling medium 52 to cool the air flow exiting the booster compressor. In an alternative embodiment, gas turbine engine 10 does not include intercooler heat exchanger 50.

In operation, ambient air, drawn into low pressure compressor inlet 26, is compressed and channeled downstream to high pressure compressor 16. High pressure compressor 16 further compresses the air and delivers high pressure air to combustor 18 where it is mixed with fuel, and the mixture is ignited to generate high temperature combustion gases. The combustion gases are channeled from combustor 18 to drive turbines 20, 22, and 24. More specifically, power turbine 24 is aerodynamically coupled to intermediate pressure turbine 22 such that thrust generated by gas turbine engine 10 is used to drive power turbine 24. Moreover, since power turbine 24 is coupled to a load 44, gas turbine engine assembly 10 also drives load 44. In the exemplary embodiment, load 44 is coupled to power turbine 24 utilizing a thrust bearing 54, and coupled to a support structure 56 utilizing a pedestal 58, for example. More specifically, both power turbine 24 and support structure 56 are coupled along centerline axis 43 such that gas turbine engine assembly 10 is substantially axially aligned with thrust bearing 54 and therefore load 44. In the exemplary embodiment, the core gas turbine engine casing is mechanically coupled to the power turbine casing using a plurality of fasteners, such that the power turbine rotor is aerodynamically coupled to the core gas turbine engine.

Figure 2:
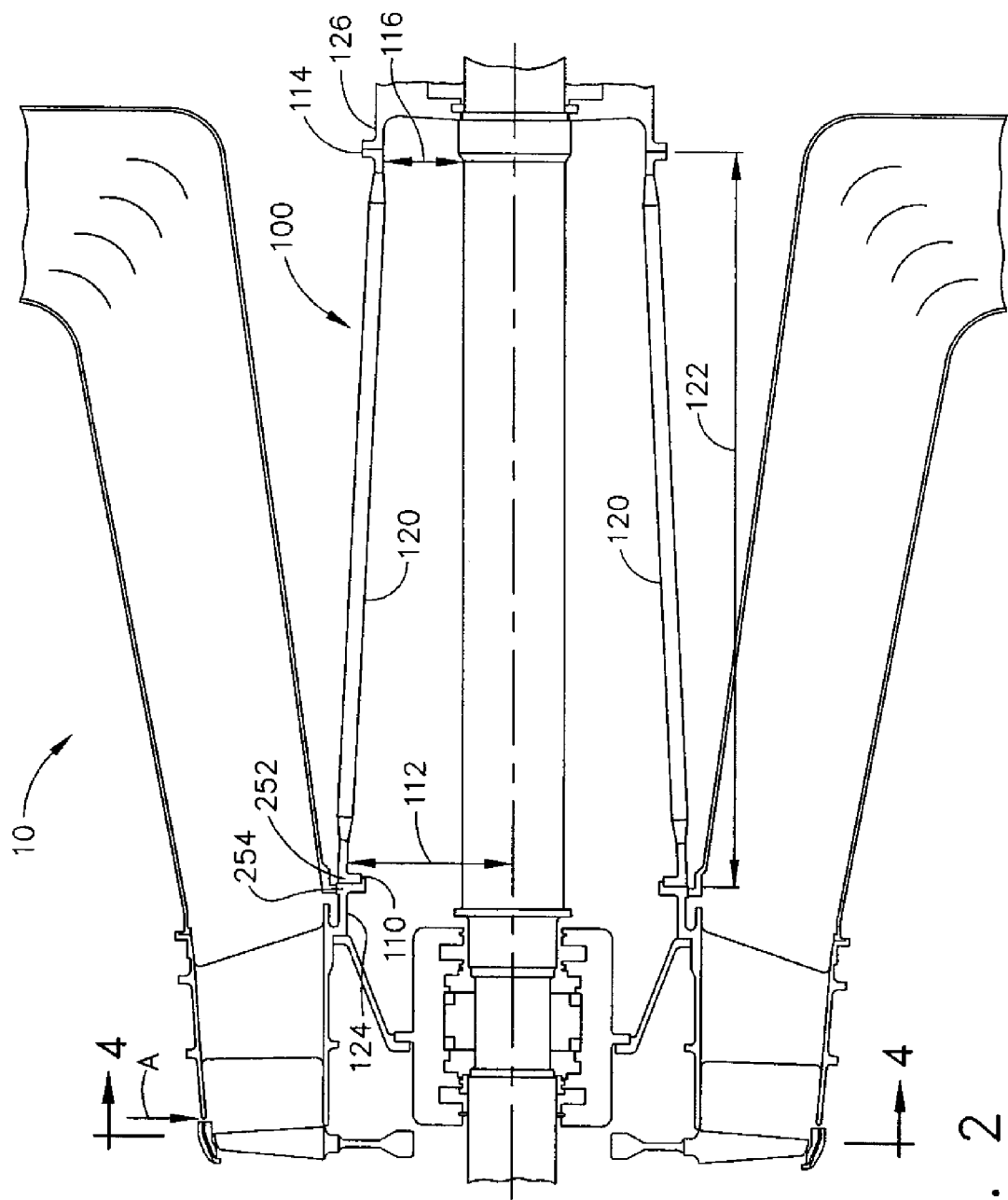
FIG. 2 is a side view of a portion of the gas turbine engine shown in FIG. 1 including a support cage.
Figure 3:
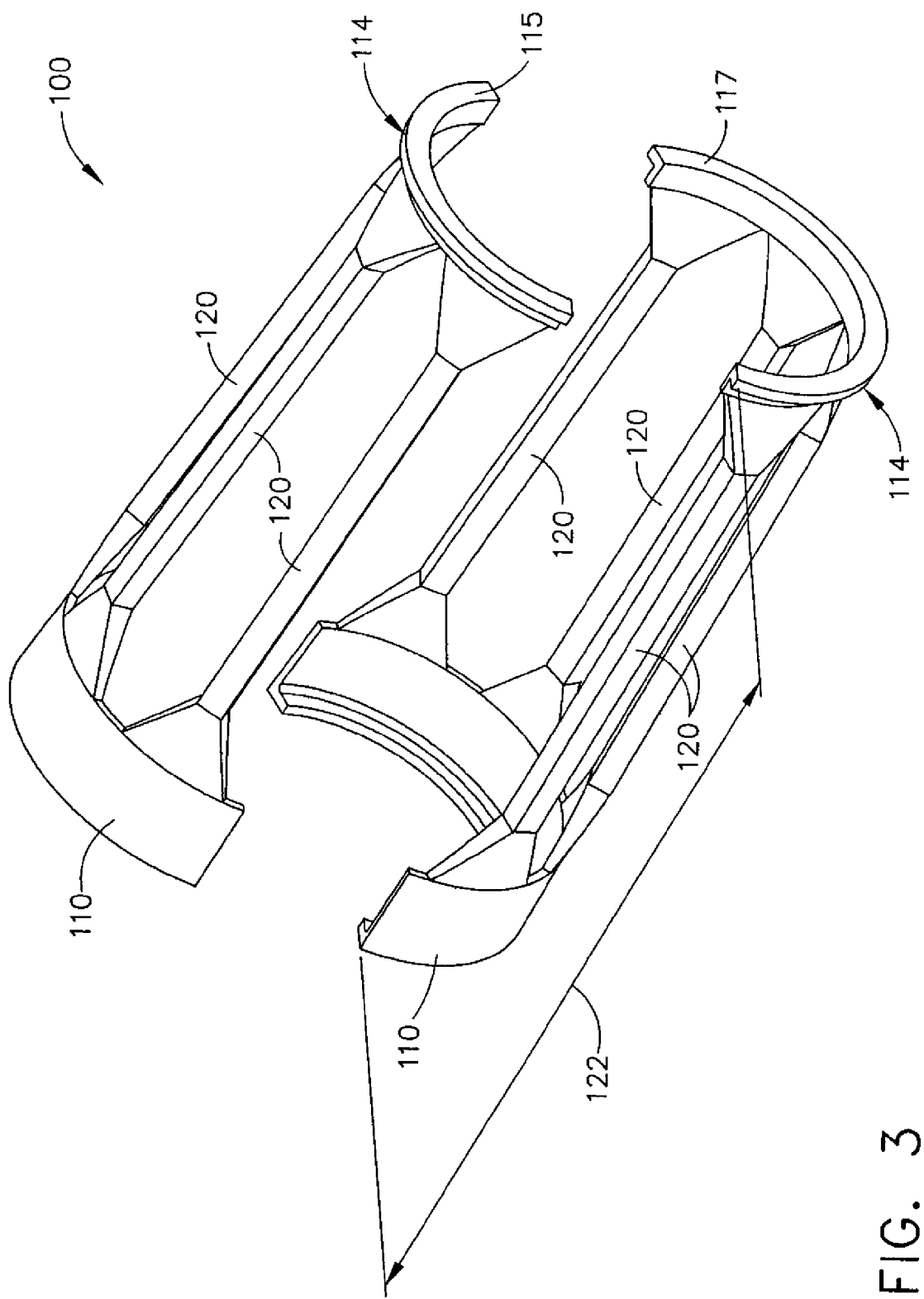
FIG. 3 is a perspective view of the support cage shown in FIG. 2.
Figure 4:
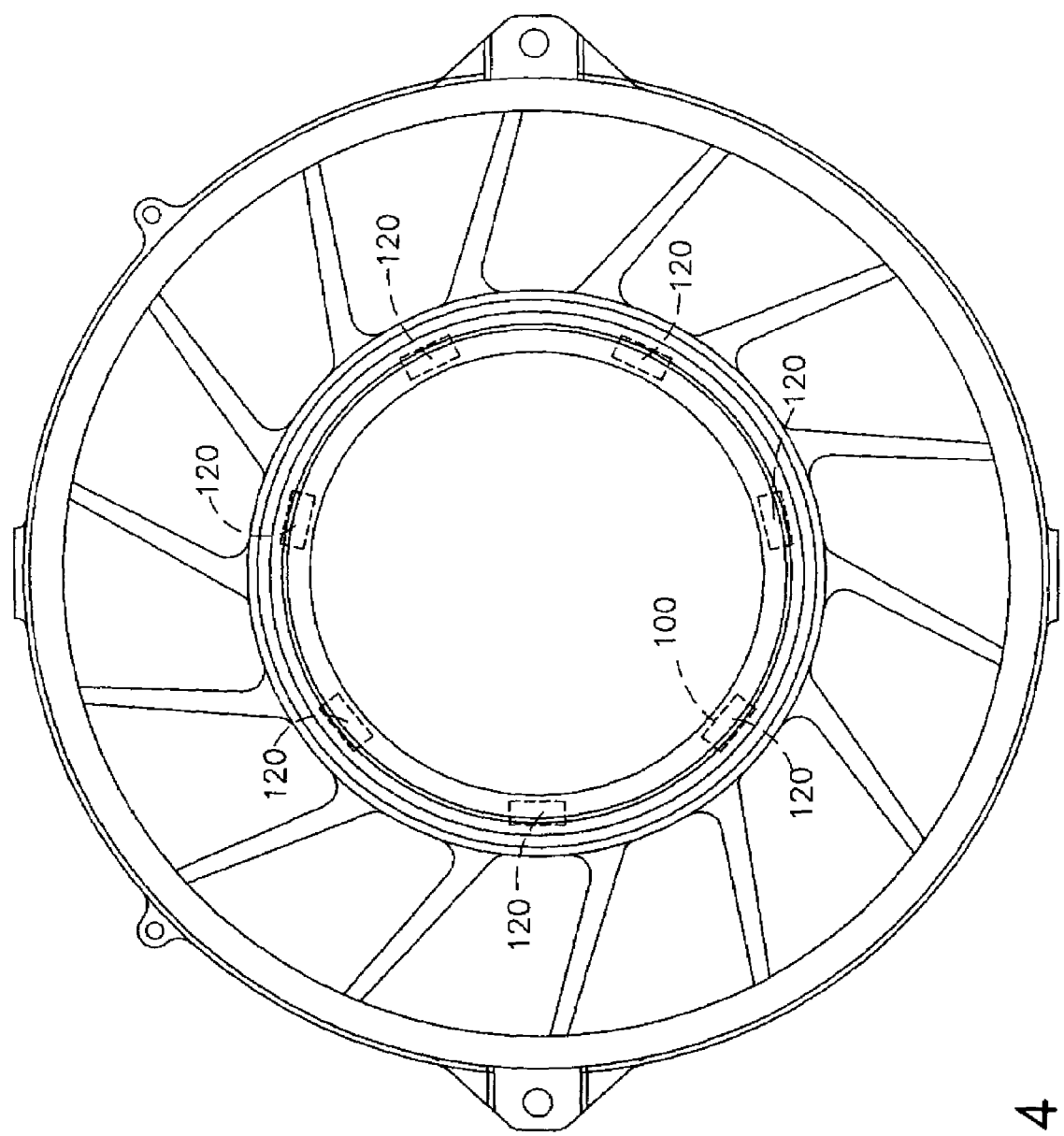
FIG. 4 is an end view of the support cage shown in FIG. 2.

FIG. 2 is a side view of a portion of the gas turbine engine shown in FIG. 1 including a support cage 100. FIG. 3 is a perspective view of the support cage shown in FIG. 2. FIG. 4 is an end view of the support cage shown in FIG. 2. In the exemplary embodiment, support cage 100 is also referred to as a gorilla cage.

In the exemplary embodiment, support cage 100 is substantially frusto-conical shaped. Alternatively, the term frusto-conical as used herein is defined as a truncated cone or pyramid. Accordingly, support cage 100 includes a first portion 110 that is substantially circular and has a first radius 112, and a second portion 114 that is substantially circular and has a second radius 116. In the exemplary embodiment, first radius 112 is larger than second radius 116.

Support cage 100 also includes a plurality of structural members 120 that extend between, and are coupled to, first and second portions 110 and 114, respectively. In the exemplary embodiment, first and second portions 110 and 114 are substantially circular. Each structural members 120 has a length 122 that is sized to enable support cage 100 to extend between a turbine rear frame 124 and a thrust bearing housing 126. Moreover, in the exemplary embodiment, each member 120 has a substantially similar length such that first portion 110 is substantially parallel to second portion 114. In the exemplary embodiment, support cage 100 includes seven structural members 120 that are approximately equally spaced around a circumference of first and second portions 110 and 114, respectively. Alternatively, support cage 100 includes more or less than seven structural members.

In the exemplary embodiment, support cage 100 includes a first support cage structure 115 and a second support cage structure 117. More specifically, support cage 100 is fabricated in two sections 115 and 117, respectively, wherein each structure includes a plurality of members 120, such that support cage 100 can be coupled to gas turbine assembly 10. In one embodiment, first support cage structure 115 is coupled to second support cage structure 117 using a welding procedure, for example. In an alternative embodiment, first support cage structure 115 is coupled to second support cage structure 117 using a plurality of mechanical fasteners. In the exemplary embodiment, first support cage structure 115 extends at least 180 degrees around the power turbine centerline axis, and second support cage structure 117 extends less than 180 degrees around the power turbine centerline axis. In an alternative embodiment, first and second support cage structures 115 and 117 each extend 180 degrees around the power turbine centerline axis.

Figure 5:
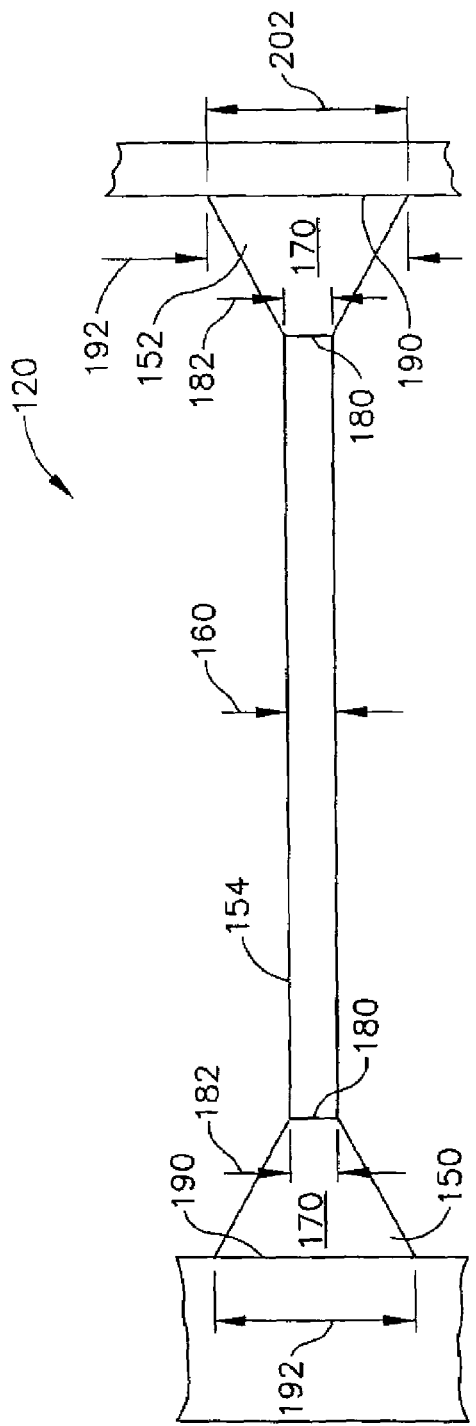
FIG. 5 is a top view of a portion of the support cage shown in FIG. 2.
Figure 6:
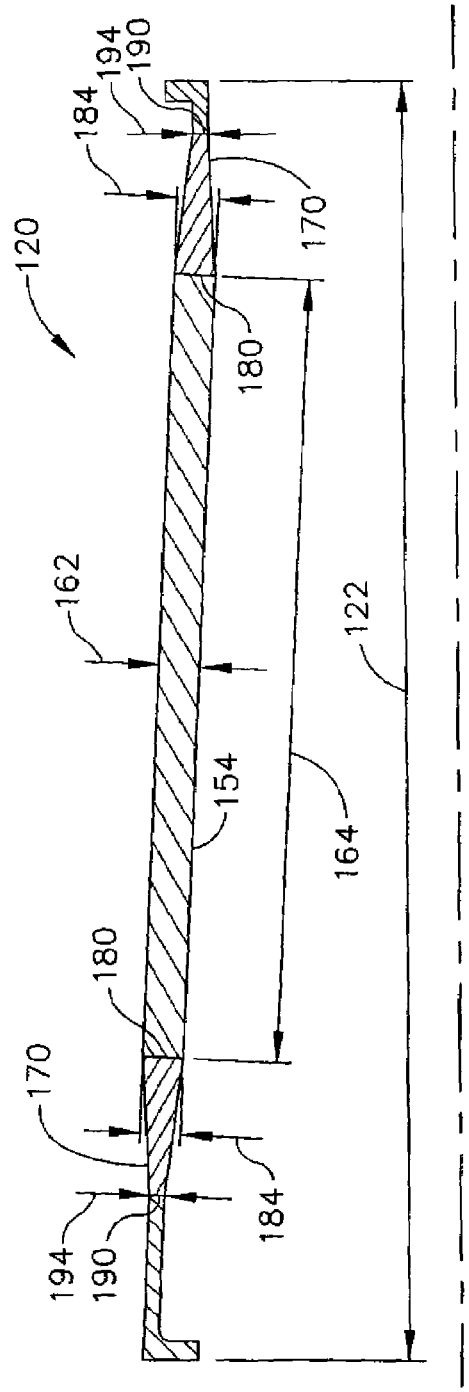
FIG. 6 is a side view of a portion of the support cage shown in FIG. 5.
Figure 7:
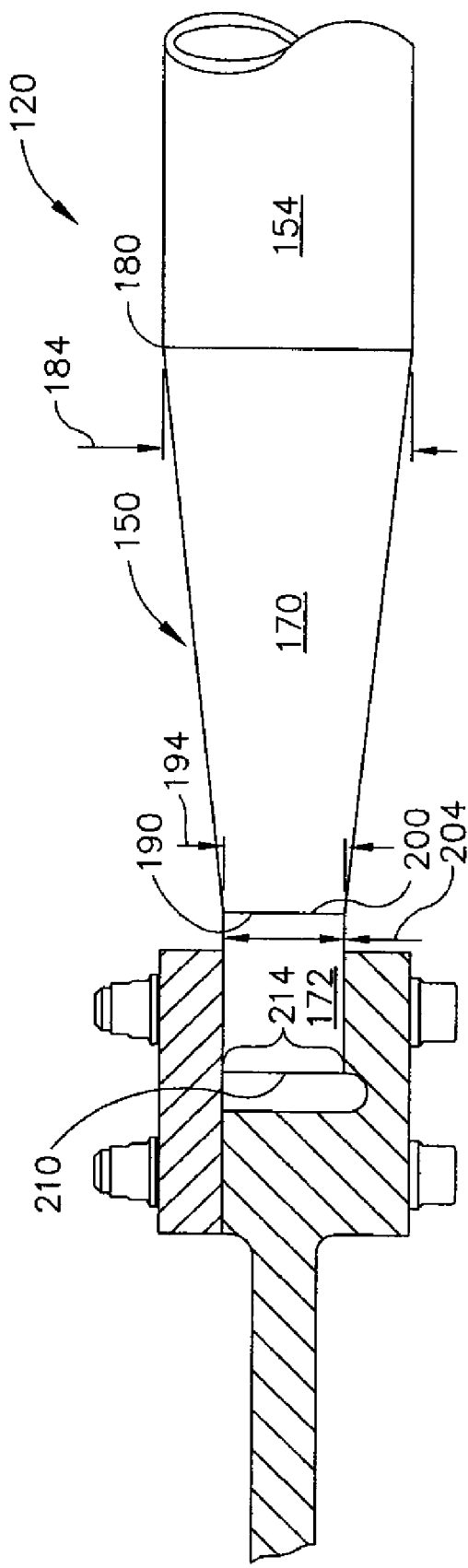
FIG. 7 is a side view of a portion of a connecting member shown in FIGS. 5 and 6.

FIG. 5 is a top view of a portion of the support cage shown in FIG. 2. Specifically, FIG. 5 is a top view of a structural member 120. FIG. 6 is a side view of the structural member shown in FIG. 5. FIG. 7 is a side view of a portion of a connecting member 120 shown in FIGS. 5 and 6. Each structural member 120 includes a first attachment foot 150, a second attachment foot 152, and a connecting member 154 that extends between, and is coupled to, first and second attachment feet 150 and 152, respectively. Connecting member 154 has a width 160, a thickness 162, and a length 164. First and second attachment feet 150 and 152 each include a first portion 170 and a second portion 172 that is coupled to first portion 170. In one embodiment, first and second portions 170 and 172 are unitarily formed together to form unitary first and second attachment feet 150 and 152. Attachment feet 150 and 152 are each coupled to connecting member 154 through a brazing and/or welding procedure, for example. In another embodiment, first and second attachment feet 150 and 152, and connecting member 154 are fabricated together unitarily to form each member 120. In an alternative embodiment, each member 120 is fabricated from a plurality of pieces.

Attachment foot first portion 170 includes a first end 180 that has a width 182 that is approximately equal to connecting member width 160, and a thickness 184 that is approximately equal to connecting member thickness 162. Attachment foot first portion 170 includes a second end 190 that has a width 192 that is wider than first end width 182, and a thickness 194 that is narrower than first end thickness 184. Accordingly, and in the exemplary embodiment, first portion 170 has a width and thickness 182 and 184, that are approximately equal to width and thickness 160 and 162 of connecting member 120. Moreover, first portion 170 has a width that gradually increases from first end 180 to second end 190, and a thickness that gradually decreases from first end 180 to second end 190.

Attachment foot second portion 172 includes a first end 200 that has a width 202 that is approximately equal to first portion width 192, and a thickness 204 that is approximately equal to first portion thickness 194. Attachment foot second portion 172 includes a second end 210 that has a width 212 that is approximately equal to width 202 and a thickness 214 that is approximately equal to thickness 204. Accordingly, and in the exemplary embodiment, second portion 172 has a width and thickness 200 and 204, that are approximately equal between first and second ends 200 and 210, respectively.

In the exemplary embodiment, support cage 100 is fabricated from a material, such as, but not limited to, AISI 4140 steel which has a relatively high modulus, good ductility (LCF capability), moderate strength, and relatively low cost. In the exemplary embodiment, members 120 flex in an axial direction and therefore absorb thrust loading between gas turbine engine 10 and power turbine 24. In another embodiment, members 120 are fabricated from a metallic material that is different than first and second portions 110 and 114, respectively.

During assembly, support cage 100 is coupled between a power turbine thrust bearing thrust housing 126 and an interior surface 252 of power turbine 24. More specifically, first portion 110 is coupled to a power turbine frame aft internal flange 254, and second portion 114 is coupled to an external surface of thrust bearing housing 126. In the exemplary embodiment, support cage 100 is coupled to gas turbine engine 10 using a plurality of mechanical fasteners such as nuts and bolts, for example. In another embodiment, support cage 100 is coupled to gas turbine engine 10 using a welding and brazing procedure for example.

In use, support cage 100 facilitates reducing the thrust load generated by the power turbine. More specifically, support cage 100 facilitates balancing the thrust load generated by the power turbine by transferring a portion of the thrust load back to the gas turbine engine. For example, in the exemplary embodiment, gas turbine engine assembly 10 generates approximately 260,000 lbs. of thrust in an axially forward direction, whereas power turbine 24 generates approximately 240,000 lbs in an axially aft direction. Accordingly, coupling power turbine 24 to thrust bearing 54 using support cage 100 facilitates balancing the total gas turbine assembly thrust flow between gas turbine engine 10 and power turbine 24 at the engine centerline thereby reducing thrust load distortions seen by known gas turbine engines utilizing side mounted thrust supports. Moreover, support cage 100 facilitates reducing the gas turbine engine structural distortion thereby improving blade tip clearances within the gas turbine engine.

Figure 8:
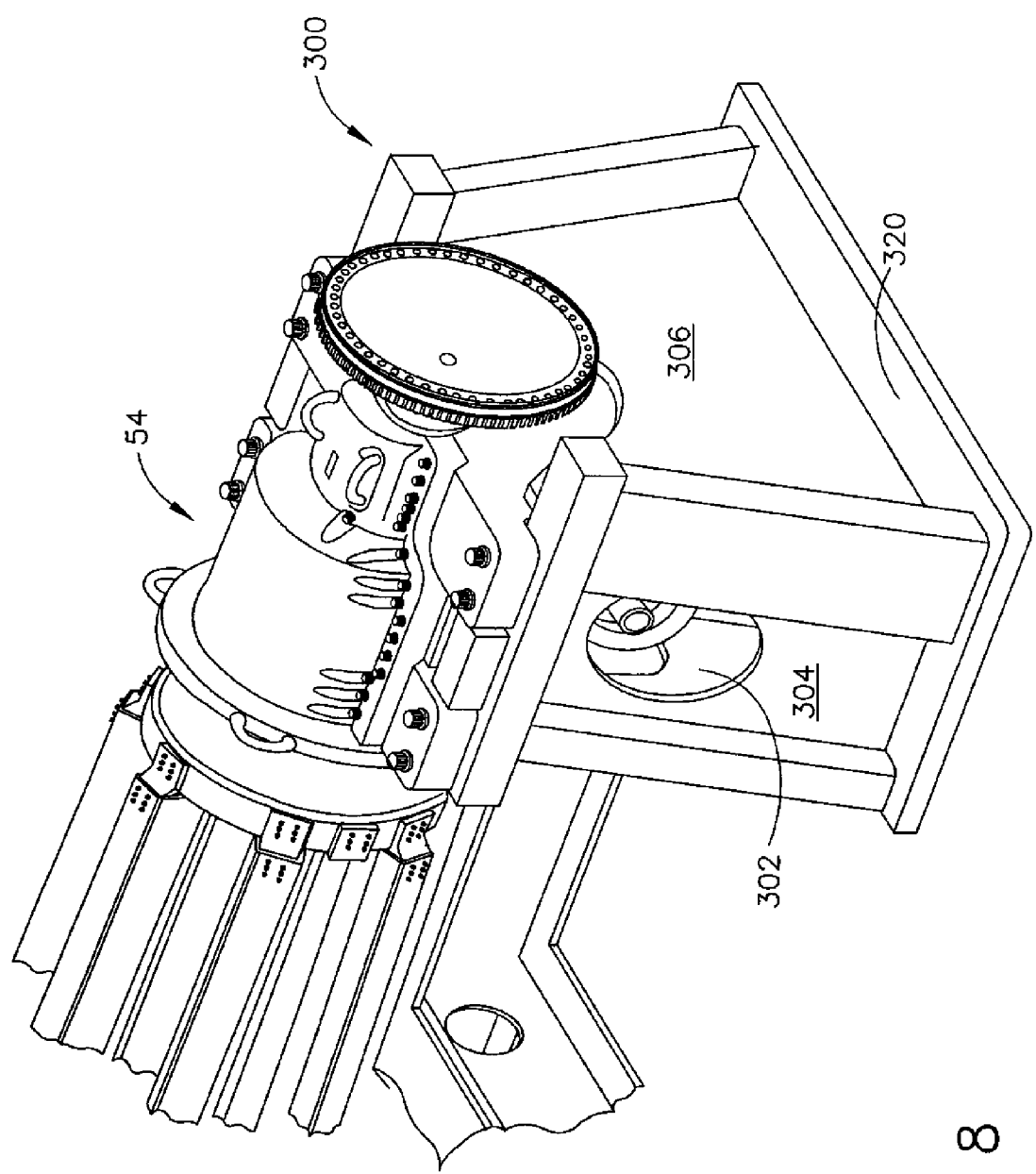
FIG. 8 is a front perspective view of an exemplary thrust bearing support assembly that can be used with the power turbine thrust bearing shown in FIG. 1.
Figure 9:
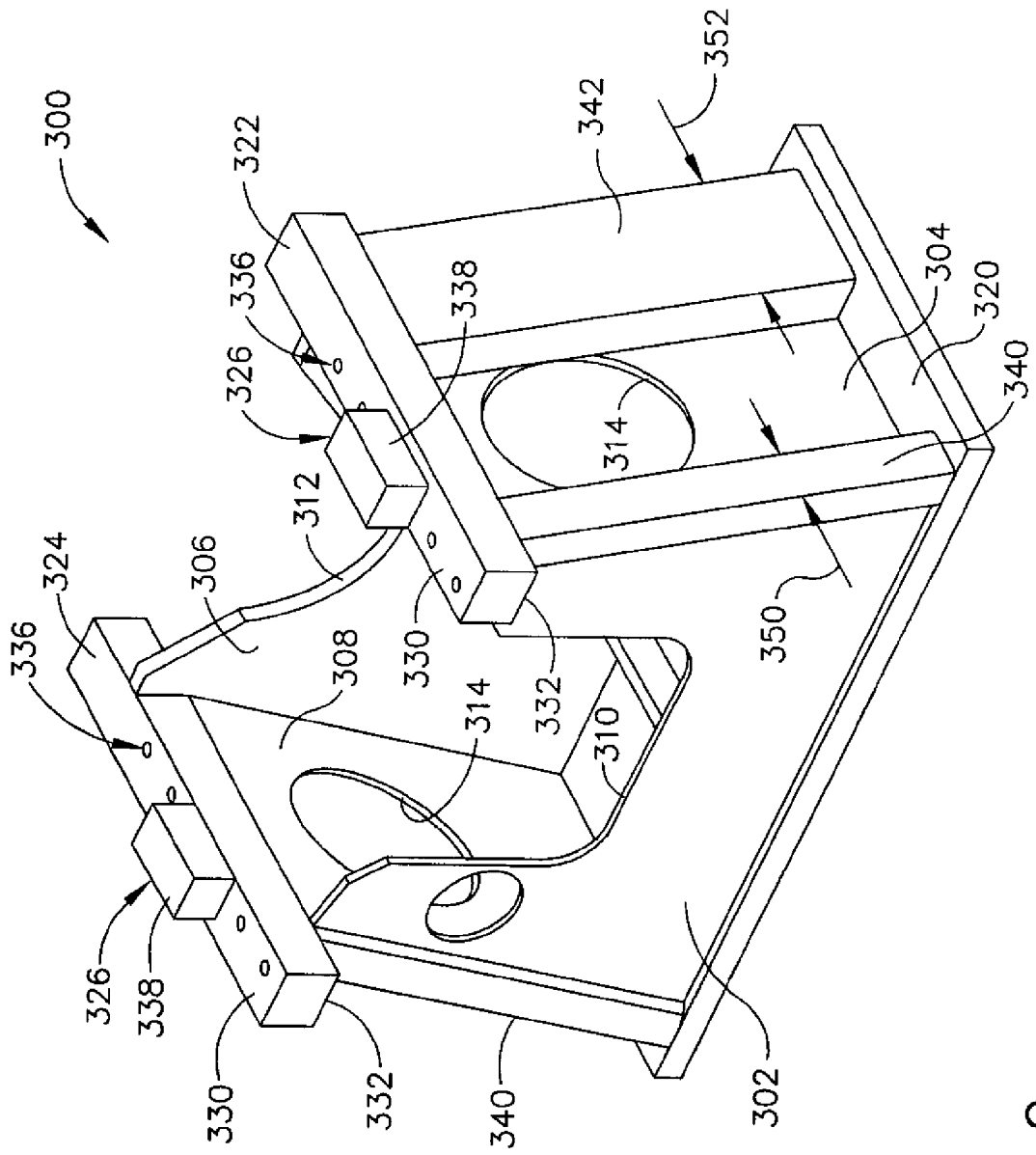
FIG. 9 is a rear perspective view of the thrust bearing support assembly shown in FIG. 8.
Figure 10:
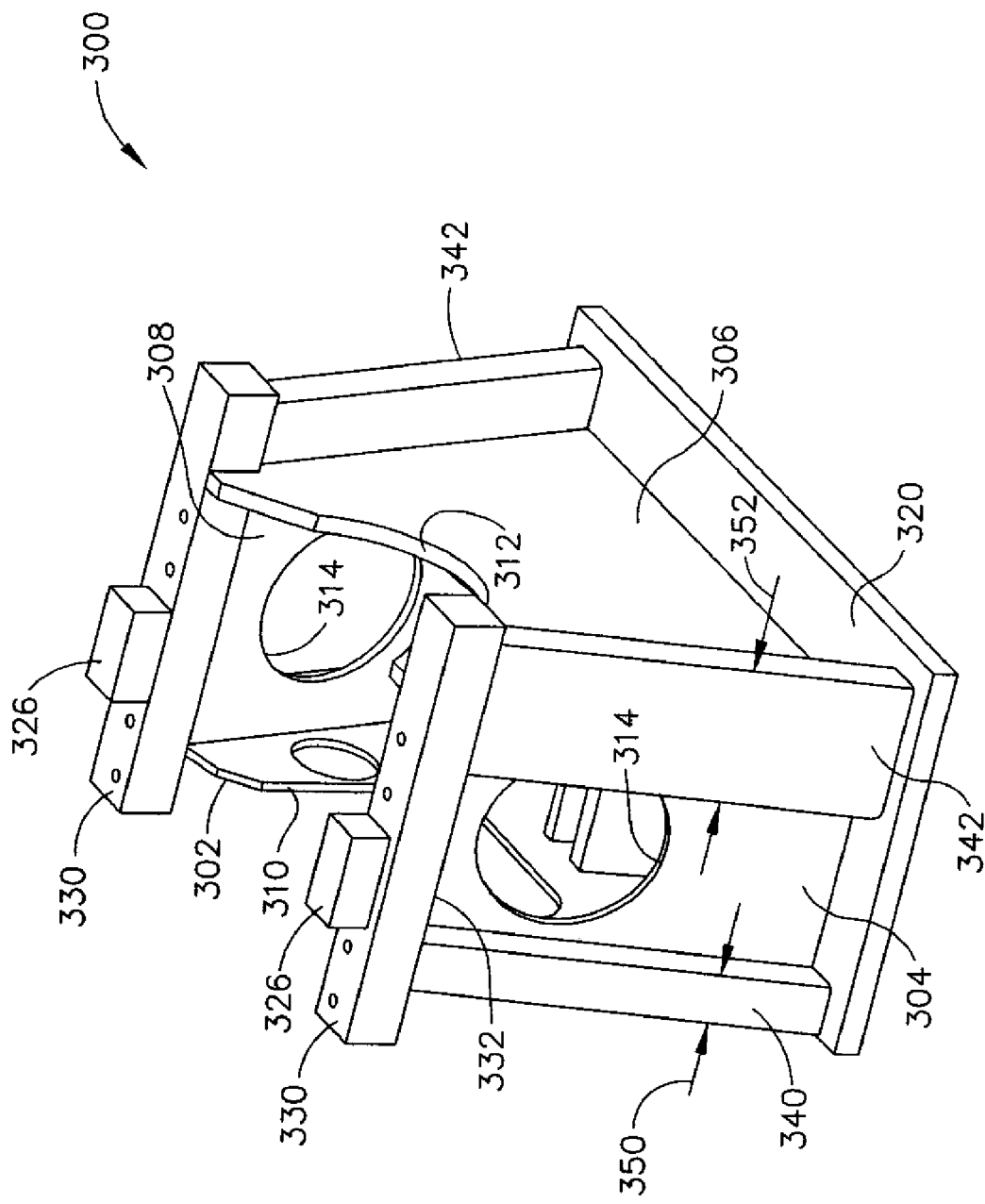
FIG. 10 is a rear perspective view of the thrust bearing support assembly shown in FIG. 8.

FIG. 8 is a front perspective view of an exemplary thrust bearing support assembly 300 that can be used with power turbine thrust bearing 54 shown in FIG. 2. FIG. 9 is a rear perspective view of thrust bearing support assembly 300. FIG. 10 is a rear perspective view of thrust bearing support assembly 300 including thrust bearing 54. In the exemplary embodiment, thrust bearing support assembly 300 includes a first side 302, a second side 304, a third side 306 that is opposite first side 302, and a fourth side 308 that is opposite second side 304. In the exemplary embodiment first, second, third, and fourth sides 302, 304, 306, and 308 are fabricated from a metallic material and coupled together using a welding procedure for example and function as shear stiffener plates. In the exemplary embodiment, the aft end of gorilla cage 100 and the forward end of thrust bearing 24 housing are coupled by a rabbet connection such that top portion of thrust bearing 24 can be removed for bearing service without disassembly of gorilla cage 100 or any other hardware.

In the exemplary embodiment, first side 302 includes an opening 310 extending therethrough that is sized to received thrust bearing 54. In the exemplary embodiment, opening 310 is substantially square. Third side 306 includes an opening 312 extending therethrough that is sized to received thrust bearing 54. In the exemplary embodiment, opening 312 is substantially semi-circular. Second and fourth sides 304 and 308, respectively, each include an opening 314 extending therethrough that is sized to receive an oil discharge pipe (not shown). In the exemplary embodiment, openings 314 are substantially circular. In the exemplary embodiment, first and third sides 302 and 306 have a substantially rectangular shape, and second and fourth sides 302 and 306 have a substantially trapezoidal shape. More specifically, thrust bearing assembly 300 includes two side that are parallel to each other 304 and 308, and two sides that are not parallel to each other 302 and 306.

Thrust bearing support assembly 300 also includes a base plate 320 that is coupled to first, second, third, and fourth sides 302, 304, 306, and 308, respectively using a welding procedure for example. Thrust bearing assembly 300 further includes a first support member 322 that is coupled to first side, second side, and fourth side 302, 304, and 308, respectively through a welding procedure for example, and a second support member 324 that hat is coupled to second side, third side, and fourth side 304, 306, and 308, respectively through a welding procedure for example. First and second support members 322 and 324 each include an alignment apparatus 326 that is coupled to each respective support member 322 and 324. First and second support members 322 and 324 each include an upper surface 330, a lower surface 332, and a plurality of openings 336 extending therethrough. In the exemplary embodiment, support members 322 and 324 are positioned such that thrust bearing 54 can be coupled between and to support members 322 and 324. More specifically, thrust bearing 54 is coupled to support members 322 and 324 using a plurality of fasteners (not shown) that extend through plurality of openings 336.

Each respective support member 322 and 324 includes an alignment block 338 that is configured to facilitate aligning thrust bearing 54 onto each respective support member 322 and 324. In the exemplary embodiment, alignment blocks 338 also facilitate absorbing thrust that is transmitted from power turbine 24 and transfers the thrust to "ground", i.e. base plate 320.

Thrust bearing support assembly 300 also a first pair of structural legs 340 and a second pair of structural legs 342 that extend between each respective support member 322 and 324 and base plate 320. In one embodiment, structural legs 340 and 342 are substantially solid. In an alternative embodiment, structural legs 340 and 342 are substantially hollow. First pair of structural legs 340 are coupled to an axially forward end of thrust bearing support assembly 300, and second pair of structural legs 342 are coupled to an axially aft end of thrust bearing support assembly 300. In the exemplary embodiment, structural legs 340 have a width 350 and structural legs 342 have a width 352 that is greater than width 342.

In use, coupling power turbine 24 to thrust bearing 54 using support cage 100 facilitates balancing the total gas turbine assembly thrust flow between gas turbine engine 10 and power turbine 24 thereby reducing thrust load distortions seen by the gas turbine engine. Moreover, support cage 100 facilitates reducing the gas turbine engine structural distortion thereby improving blade tip clearances within the gas turbine engine. Moreover, substantially all of the thrust load gener ated by the gas turbine engine assembly and the power turbine is reacted at the "engine centerline" axis 43 at thrust bearing 54 and transferred to ground thru pedestal structure 58. Accordingly, substantially all of the thrust generated by high pressure turbine 20, intermediate pressure turbine 22, and low pressure or power turbine 24 are reacted to ground, i.e. pedestal structure 58 utilizing support cage 100.

More specifically, thrust bearing support assembly 300 facilitates absorbing the remaining portion of thrust, or residual thrust, that is not substantially eliminated by support structure 100 by transferring the residual thrust to "ground" i.e. the support assembly 300. For example in the exemplary embodiment, gas turbine engine assembly 10 generates approximately 260,000 lbs. of thrust in an axially forward direction, whereas power turbine 24 generates approximately 240,000 lbs in an axially aft direction. Accordingly, coupling power turbine 24 to thrust bearing 54 using support cage 100 facilitates balancing substantially all of the thrust load generated by the core gas turbine engine and the power turbine between the core gas turbine engine and the power at a gas turbine engine centerline axis.

Moreover, utilizing thrust bearing support assembly 300 facilitates transferring the remaining or residual thrust load, i.e. approximately 20,000 lbs. to ground by increasing a structural stiffness of the thrust bearing support assembly. Accordingly, the thrust bearing support assembly described herein facilitates substantially eliminating the gas turbine engine structural distortion thereby improving blade tip clearances within the gas turbine engine.

The above-described thrust bearing support assembly provides a cost-effective and device for transferring the power turbine thrust load from the power turbine thrust bearing to the thrust bearing support assembly. Accordingly, a thrust path is created between the core gas turbine engine and ground in a cost-effective manner.

An exemplary embodiment of thrust bearing support assembly is described above in detail. The thrust bearing support assembly is not limited to the specific embodiments described herein, but rather, components of the thrust bearing support assembly may be utilized independently and separately from other components described herein. Moreover, the thrust bearing support assembly described herein can also be used in combination with a variety of gas turbine engines.

While the invention has been described in terms of various specific embodiments, those skilled in the art will recognize that the invention can be practiced with modification within the spirit and scope of the claims.

What is claimed is:

1. A thrust bearing support assembly comprising:
   a first trapezoidally-shaped side;
   a second rectangularly-shaped side coupled to said first side;
   a third trapezoidally-shaped side coupled to said second side;
   a fourth rectangularly-shaped side coupled to said first and third sides; and
   at least one alignment block is each coupled to at least two of said first, second, third, and fourth sides,
   wherein, said thrust bearing support assembly supports a thrust bearing through which a rotatable shaft for an engine extends, the rotatable shaft defining an engine centerline, said thrust bearing support assembly supporting the thrust bearing such that a net axial thrust of the engine reacts through said thrust bearing support assembly at the engine centerline, wherein the thrust bearing is supported such that at least a portion of thrust generated by the engine is reacted to ground.

2. A thrust bearing support assembly in accordance with claim 1 further comprising a base plate coupled to a first edge of at least two of said first, second, third, and fourth sides.

3. A thrust bearing support assembly in accordance with claim 1 further comprising a pair of thrust bearing support members, each of said thrust bearing support members coupled to a second edge of at least two of said first, second, third, and fourth sides, the second edge on an opposite side of the at least two of said first, second, third, and fourth sides from a base plate, each of said thrust bearing support members configured to mate with the thrust bearing.

4. A thrust bearing support assembly in accordance with claim 3 wherein each of said at least one alignment block is coupled to each respective thrust bearing support member to facilitate aligning said thrust bearing with the engine.

5. A thrust bearing support assembly in accordance with claim 4 wherein each of said at least one alignment block is configured to facilitate maintaining a position of the thrust bearing in an axial direction with respect to the engine.

6. A thrust bearing support assembly in accordance with claim 1 further comprising:
   a first pair of structural members coupled to one of said thrust bearing support members; and
   a second pair of structural members coupled to an opposing one of said thrust bearing support members.

7. A thrust bearing support assembly in accordance with claim 6 wherein said first and second pair of structural members are substantially hollow.

* * * * *